United States Patent [19]
Beier

[11] Patent Number: 4,672,629
[45] Date of Patent: Jun. 9, 1987

[54] RECEIVER FOR BANDSPREAD SIGNALS

[75] Inventor: Wolfgang Beier, Weil der Stadt, Fed. Rep. of Germany

[73] Assignee: Standard Elektrik Lorenz Aktiengesellschaft, Stuttgart, Fed. Rep. of Germany

[21] Appl. No.: 758,191

[22] Filed: Jul. 23, 1985

[30] Foreign Application Priority Data

Jul. 23, 1984 [DE] Fed. Rep. of Germany ....... 3427058

[51] Int. Cl.$^4$ ............................................. H04K 1/02
[52] U.S. Cl. ......................................... 375/1; 375/38; 375/40; 375/115
[58] Field of Search ................. 375/1, 38, 39, 40, 100, 375/115; 329/50; 178/22.17; 455/133, 136

[56] References Cited

U.S. PATENT DOCUMENTS

| | | | |
|---|---|---|---|
| 4,221,005 | 9/1980 | LaFlame | 375/1 |
| 4,291,409 | 9/1981 | Weinberg et al. | 375/1 |
| 4,485,477 | 11/1984 | Nossen | 375/1 |
| 4,575,861 | 3/1986 | Levreault | 375/1 |

Primary Examiner—Benedict V. Safourek
Assistant Examiner—M. Huseman
Attorney, Agent, or Firm—T. L. Peterson

[57] ABSTRACT

A receiver for bandspread signals having a pseudo-random code stored in the receiver for synchronization with a pseudo-random code (PRC) of a received and modulated signal for recovering the modulation utilizing control loops. The modulated carrier signal is frequency converted, digitized and then multiplied by the stored PRC. The signal provided is sampled at twice the rate at which the PRC is read out of memory and provided to a counter forming I and Q signals from the counter output values in the control loops for determining a plurality of controlled variables required for synchronization and demodulation.

16 Claims, 8 Drawing Figures

RECEIVER FOR BANDSPREAD SIGNALS

BACKGROUND OF THE INVENTION

1. Field of the Invention

The invention relates generally to signal receivers and more particularly to a receiver for bandspread signals.

2. Description of the Prior Art

In the field of signal processing, bandspread signals are signals in which a high frequency carrier is encoded with a pseudo-random code (hereinafter PRC). The PRC which is a digital spectrum-spreading code is modulated by a modulation signal and is employed for data transmission. Frequently, the modulation signal is also a digital signal. In this case, a second digital signal is thus superimposed on the first digital signal (e.g. the PRC) for data transmission. Generally, the clock rates of the first digital signal (PRC) and the second digital signal (modulation signal) are significantly different.

The PRC is employed by the transmitter for bandspreading signals but is also stored in the receiver. Moreover, the receiver also contains a clock pulse generator which producers a clock pulse signal for controlling the read-out of the PRC from a memory It is necessary for the phase of the clock pulse signal to be controlled so as to produce temporal coincidence between the PRC stored in the receiver and the PRC of the received signals. The range of the transmitter station from the receiver can be determined on the basis of the phase shift between the PRC of the received signals and the PRC stored in the receiver.

Examples of systems which employ bandspread signals are the Joint Tactical Information Distribution System (JTIDS) and the Global Positioning System (GPS). The GPS is described in the publication "Navigation: Journal of the Institute of Navigation", Vol. 25, No. 2, Summer 1978, pages 121 to 146. The article is entitled "GPS Signal Structure and Performance Characteristics", by J. J. Spilker, Jr. Receivers for bandspread signals are described on pages 139 to 146 of the above-cited GPS publication. In the prior art GPS receiver, the phase of the stored PRC is controlled with a π-dither control loop or an early/late control loop. Also, a costas loop is provided in which I and Q components of a modulated carrier signal are formed following suitable signal processing involving conversion to an intermediate frequency (IF) value. Further, the costas loop permits the modulated signal to be recovered. However, a problem exists in the prior art in that the implementation of such receivers is very complicated and costly.

SUMMARY OF THE PRESENT INVENTION

It is therefore an object of the present invention to provide an improved receiver for bandspread signals which can be implemented in a simple manner.

It is a further object to provide an improved receiver for bandspread signals which can be implemented with a very high integration level.

It is a further object to provide an improved receiver for bandspread signals having a plurality of functions which can be performed by a processor.

It is a further object to provide an improved receiver for bandspread signals which does not require frequency and amplitude control means.

Briefly, a preferred embodiment of the present invention includes a receiver for bandspread signals having a receiving section, a modulation section, a costas loop and an early/late control loop. The receiver section includes an antenna, a frequency conversion means and a digitizing means. The modulation section includes a pseudo-random code (PRC) memory while the costas loop includes a plurality of multipliers, a phase shifter means, a clock pulse generator, summing circuits and a low-pass filter. The early/late control loop includes a sampling means, the PRC memory, a divider, a clock pulse generator, a counter, a multiplier, a summing circuit, a squaring circuit, a low-pass filter and a processor.

A pseudo-random coded signal is received by the antenna of the receiver. The PRC stored in the receiver memory is synchronized with the PRC of the received and modulated signal and the modulation is recovered. The means provided for this modulation recovery include the costas loop and the early/late control loop. The received modulated carrier signal is first converted to an intermediate frequency value and then digitized and multiplied by the stored PRC in memory. The signal provided in this manner is sampled at twice the rate at which the PRC is read out of the memory. The sampled signal is then provided to a counter where I and Q signals are formed from the counter output values. The controlled variables required for synchronization and demodulation are determined from the I and Q signals in control loops.

An advantage of the receiver for bandspread signals of the present invention is that the receiver can be implemented in a simple manner.

Another advantage is that the receiver for bandspread signals can be implemented with a very high integration level.

A further advantage is that the receiver for bandspread signals has a plurality of functions which can be performed by a processor.

A further advantage is that the receiver for bandspread signals does not require frequency and amplitude control means.

These and other objects and advantages of the present invention will no doubt become obvious to those of ordinary skill in the art after having read the following detailed description of the preferred embodiment which is illustrated in the various drawing figures.

IN THE DRAWING

DETAILED DESCRIPTION OF THE PREFERRED EMBODIMENT

Figure 1:
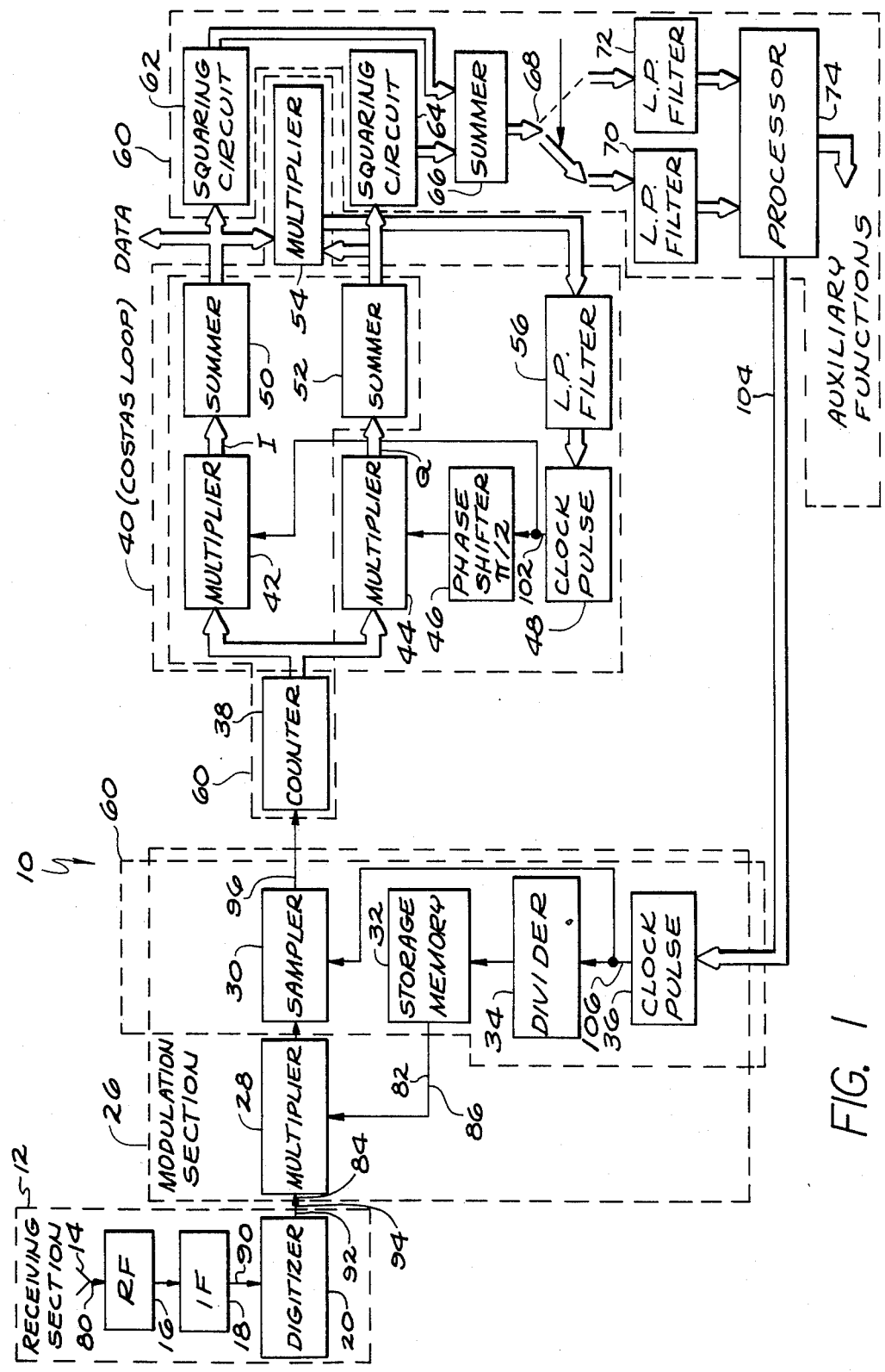
FIG. 1 is a block diagram of a receiver for bandspread signals in accordance with the present invention.

FIG. 1 illustrates a receiver for bandspread signals referred to by the general reference character 10 and incorporating the present invention. The receiver 10 includes a receiving section 12 having an antenna 14, a radio frequency (RF) section 16, an intermediate frequency (IF) section 18 and a digitizer 20. The receiver 10 further includes a modulation section 26 having a multiplier circuit 28, a sampling circuit 30, a storage memory 32, a divider circuit 34 and a processor controlled clock pulse generator 36. Also included is a counter 38 and a costas loop 40. The costas loop 40 includes a pair of multiplier circuits 42 and 44, a phase-shifter means 46, a filter controlled clock pulse generator 48, a first summing circuit 50, a second summing circuit 52, a multiplier circuit 54 and a first digital low-pass filter 56. Lastly, the receiver 10 includes an early-/late control loop 60 including the sampling circuit 30, the storage memory 32, the divider circuit 34, the clock pulse generator 36, the counter 38, the multiplier circuit 42, the first summing circuit 50, the second summing circuit 52 and further including a first squaring circuit 62, a second squaring circuit 64, a third summing circuit 66, a junction point 68, a second digital low-pass filter 70, a third digital low-pass filter 72 and a processor 74.

Figure 2:
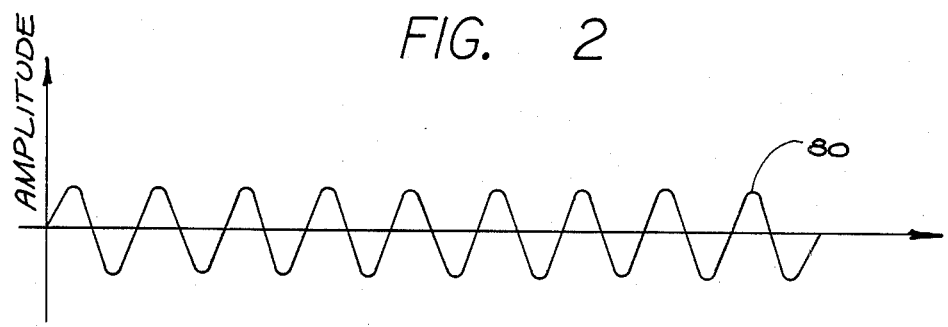
FIG. 2 is a signal diagram illustrating a high frequency carrier wave employed in the receiver of FIG. 1.
Figure 3:
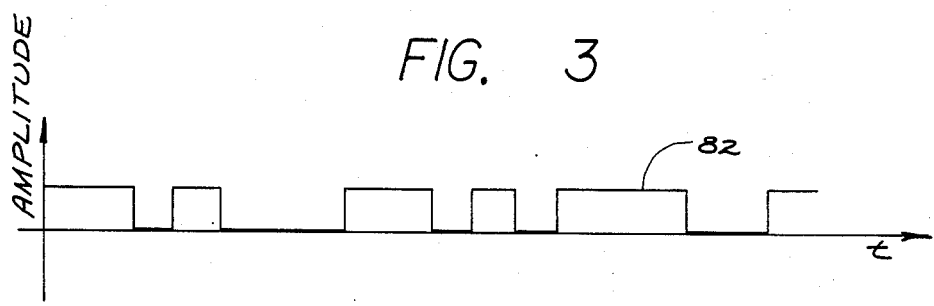
FIG. 3 is a signal diagram illustrating a pseudo-random code employed in the receiver of FIG. 1.
Figure 4:
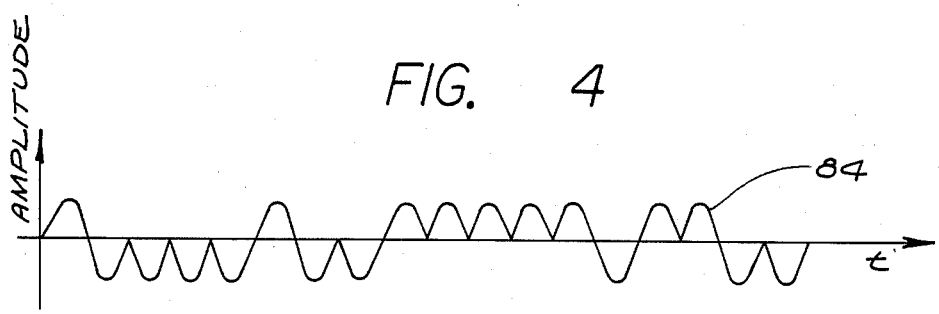
FIG. 4 is a signal diagram illustrating a bandspread carrier signal employed in the receiver of FIG. 1.

FIGS. 2, 3 and 4 illustrate the generation of a bandspread signal. In FIG. 2, a high-frequency carrier wave 80 having an example frequency of one-gigahertz is modulated by a pseudo-random code (PRC)82 shown in FIG. 3. The PRC 82 consists of zero-state and one-state signals and has a clock rate of one megahertz by example. The phase of the carrier wave 80 either remains unchanged or is shifted by 180° depending upon whether the PRC 82 is in the zero-state or the one-state. FIG. 4 illustrates the bandspread signal generated after modulation by the PRC 82 and will hereinafter be called the carrier signal 84 which can be employed by a Global positioning system for measurement of a range parameter. If the phase of the PRC 82 stored in the receiver 10 is controlled in such a manner as to again bring the PRC 82 and the pseudo-random code within a received signal into temporal coincidence, the range parameter can be determined in a known manner. If data is to be transmitted by means of the (bandspread) carrier signal 84, then signal 84 is modulated by a signal 86 containing the data providing a modulated carrier signal 88. The modulation signal 86 can also be a digital signal which in this case would be a further digital signal superimposed onto the digital PRC 82. The clock rates of the digital PRC 82 and the digital modulation signal 86 should preferably differ clearly one from the other. Clock rates of 1 megahertz for PRC 82 and 50 hertz for the digital modulation signal 86 are suitable values. The Global positioning system is a known system in which (bandspread) carrier signals 84 are employed and in which both ranging and data transmission are performed. In the receiver 10, the control criteria are the same as in the prior art, however, the receiver 10 is implemented in a significantly different manner than the known receiver. Since the control criteria are known, they will not be discussed in any further detail in the preferred embodiment.

Figure 5:
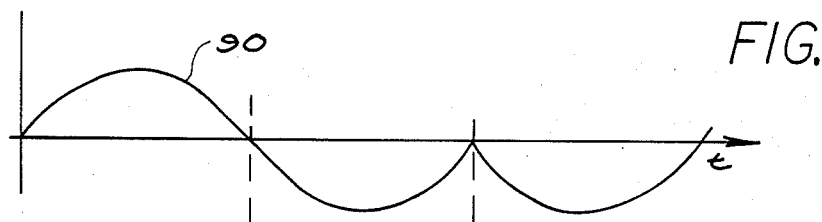
FIG. 5 is an output signal from an intermediate frequency section of the receiver of FIG. 1.
Figure 6:
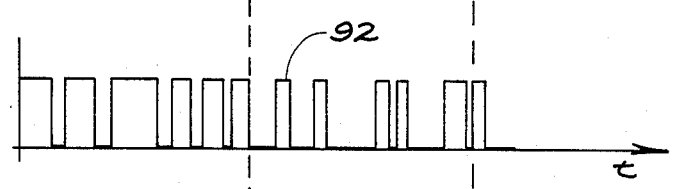
FIG. 6 is an output signal from a digitizer of the receiver of FIG. 1.
Figure 7:
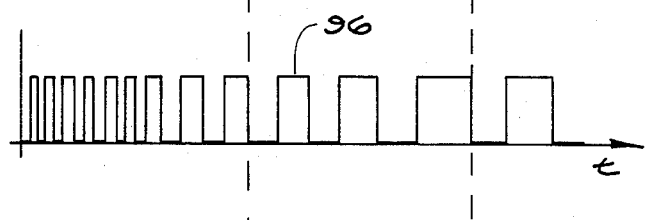
FIG. 7 is an output signal from a sampling circuit of the receiver of FIG. 1.

Referring again to FIG. 1, the carrier signal 84 is received by the antenna 14 and provided to the RF section 16. Frequency conversion to 5 kilohertz is performed in the IF section 18 disposed behind the RF section 16. The frequency of an output IF signal 90 from the IF section 18 is illustrated in FIG. 5 and is selected such that it will continue to be unequal to zero when the maximum expected doppler shift occurs. The IF signal 90 is then digitized in the digitizer 20 providing an output digitizer signal 92 illustrated in FIG. 6. The digitizer signal 92 is in the one-state if a threshold is exceeded or in the zero-state if the threshold is not exceeded. A suitable threshold is an amplitude of zero. A noise signal 94, whose amplitude is approximately twenty decibels greater than that of the modulated carrier signal 88, is superimposed onto the received carrier signal 84 which is modulated by data. If there is not a received carrier signal 84 then the number of zeros and ones in the digitizer signal 92 is identical. The digitizer signal 92 is then multiplied by the PRC 82 in the multiplier circuit 28. The signal produced thereby is sampled in the sampling circuit 30 at twice the frequency with which the PRC 82 is read out of the storage memory 32. A sampling circuit output signal 96 provided by the sampling procedure is illustrated in FIG. 7.

Figure 8:
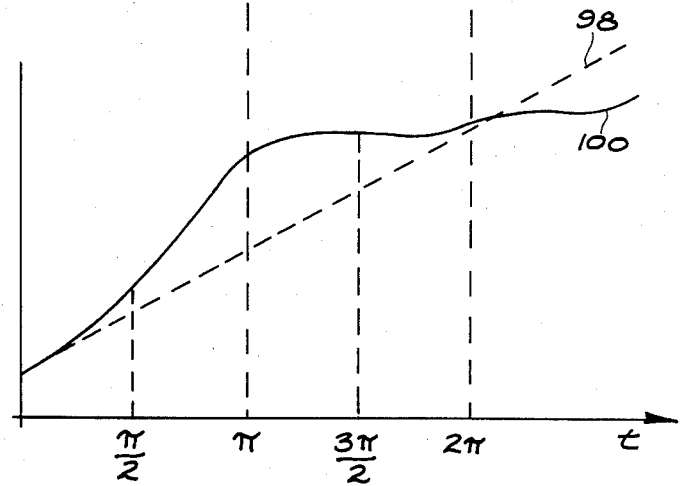
FIG. 8 is an output signal from a counter of the receiver of FIG. 1.

Beyond multiplier circuit 28, the zeros and ones will no longer be distributed equally throughout the digitizer signal 92 if the received carrier signal 84 is present whether the modulation signal 86 is present for data transmission or not. The distribution of the frequency of occurrence of the zeros and ones will change at the IF signal frequency 90 of the carrier signal 84 as illustrated in FIGS. 5 and 6. If the received carrier signal 84 is not subjected to a doppler shift the frequency of occurrence of zeros and ones will change at the rate of 5 kilohertz, however, if the signal has the expected doppler frequencies, the frequency of change will be between 500 hertz and 9.5 kilohertz. The sampling circuit output signal 96 is provided to the counter 38 and if there is not a carrier signal 84 present, the count increases in a linear manner as is illustrated by a dashed line 98 in FIG. 8. However, if a carrier signal 84 is present, a curve of the count will produce a line 100 whose slope is alternately greater and less than that of the dashed line 98 as is illustrated in FIG. 8. The line curve 100 of FIG. 8 will be the same whether the modulation signal 86 is present or not. The counts are continuously provided to the pair of multiplier circuits 42, 44 each of which receive a clock signal 102 comprising a regular sequence of "+1s" and "−1s" generated by the clock pulse generator 48. The clock rate of clock pulse generator 48 is identical to the IF signal frequency 90 so that it contains any doppler shift which may be present. The clock signal 102 transmitted to the multiplier circuit 44 is offset by a half period of the IF signal 90 relative to the clock signal 102 transmitted to the multiplier circuit 42 by employing the phase-shifter means 46. The output signals from the multiplier circuits 42 and 44 correspond to the I and Q components of the signals from counter 38 and are employed for producing control signals in the same manner as they are also produced in the known receivers.

In the first summing circuit 50 and the second summing circuit 52, a single sum is formed for each period of the clock signal 102 provided by the clock pulse generator 48. Those sums are:

$$I = -Z(0) + 2Z(\pi) - Z(2\pi) \quad (1)$$

and $$Q = -Z(0) + 2Z(\pi/2) - 2Z(3\pi/2) + Z(2\pi) \quad (2)$$

with each of the addends being the respective count at the instances given in parentheses. The control lines which ensure that the counts are further processed at the desired times are not illustrated in FIG. 1, as those of ordinary skill in the art will be able to appropriately complement the circuit illustrated in FIG. 1 if they are aware of its function. The sums I and Q are multiplied together in the multiplier circuit 54 with the products of the multiplication process being provided to the first digital low-pass filter 56. The output signal of the filter 56 controls the frequency and the phase of clock pulse generator 48 such that its output clock signal 102 has the same frequency and phase as the carrier signal 84 converted to the IF signal frequency 90. The multiplier circuits 42, 44 and 54, the first and second summing circuits 50, 52, the filter 56, the clock pulse generator 48 and the phase-shifting means 46 form a Costas loop 40. In the controlled state, the sequence of numerical values I outputted by the first summing circuit 50 represents the modulation signal 86 from which the data transmitted (via the modulation signal 86) is recovered in a known manner by employing an evaluation device (not shown). The values I and Q are also provided to the first and second squaring circuits 62, 64 respectfully where each of the I and Q values are squared. The squares of the I and Q values are added in the third summing circuit 66 with the sums representing the amplitude of the carrier signal 84. The sums are alternately provided to the second digital low-pass filter 70 and the third digital low-pass filter 72 at junction point 68. Changeover between the filters 70 and 72 occurs at the same rate at which the PRC 82 is read from the storage memory 32 ($\pi$-dither frequency; 125 hertz). The output signals from the second and third digital low-pass filters 70 and 72 are provided to the processor 74 where the sums of and the differences between the filters 70 and 72 are calculated. Processor 74 also supplies other auxiliary functions (not shown). A control signal 104 is determined therefrom in a known manner and is utilized to control the phase of a clock pulse signal 106 provided by the clock pulse generator 36. After the clock signal 106 has been divided by two in the divider circuit 34, the clock signal 106 controls the read-out of the PRC 82 from the storage memory 32. Further, the clock signal 106 serves as the clocking signal for sampling circuit 30. Phase control is performed such that the PRC 82 stored in the memory 32 of the receiver 10 has the same phase as the pseudo-random code of the received carrier signal 84. The time position of the PRC 82 referred to a reference period is proportional to the distance between the receiver 10 and a transmitting station and is also provided to the evaluation device (not shown). The clock pulse generator 36, the divider circuit 34, the storage memory 32, the sampling circuit 30, the counter 38, the multiplier circuit 42, the first and second summing circuits 50, 52, the first and second squaring circuits 62, 64, the third summing circuit 66, the second and third digital low-pass filters 70, 72 and the processor 74 form the known early/late control loop 60. The clock signal 106 outputted by the clock pulse generator 36 is also periodically advanced or delayed (at a clock rate of 125 hertz) by one clock period under the control of the processor 74 as is known from the cited Global Positioning System literature. The recitations made in conjunction with the Costas loop 40 also apply to the early/late control loop 60 with respect to the block diagram illustrated in FIG. 1. The clock signals 106 which result as a matter of course from the early/late control loop 60 are not graphically illustrated as those of ordinary skill in the art will be able to make the appropriate complementation. Implementation of the individual assemblies is also within the ability of the skilled practitioner. Thus, by example, multiplier circuit 28 can be an exclusive - OR gate and the sampling circuit 30 can be implemented advantageously in the form of a J-K flip-flop circuit (not shown) which receives the required clock signals 106 from the clock pulse generator 36. Moreover, it is also possible to implement several of the above indicated assemblies by means of the processor 74 as numerical values are processed in numerous locations. The novel receiver 10 can be implemented with a very high integration level. A large portion of the functions can be performed by the processor 74. In the instant invention, only a small amount of circuitry is required to implement the RF section 16. In particular, frequency and amplitude control means are not necessary. It is possible to expand the receiver 10 in a simple manner such that the receiver 10 is capable of contacting a plurality of satellites utlizing time-division multiplexing techniques. Those techniques are necessary if the receiver 10 is to be implemented in the form of the Global Positioning System receiver. Much of the additional sophistication required heretofore has been eliminated.

In the above description, reference has been variously made to the PRC 82. In the Global Position System, each satellite (i.e. the transmitting stations) has a specific pseudo-random code. For navigational purposes, it is necessary for the ranges to a plurality of satellites to be measured either simultaneously or, at least, in rapid succession. With the new receiver 10, this can be performed in an advantageous manner using time-division multiplexing. For this purpose, it is necessary for the pseudo-random codes of the desired satellites to be stored in the receiver 10. Change-over from one pseudo-random code to the next takes place after every millisecond, with the above-described control operations being performed during these periods. The control circuits remain locked onto all desired satellites and data demodulation of the signals received from all satellites is possible without interruption.

"Although the present invention has been described in terms of the presently preferred embodiment(s), it is to be understood that such disclosure is to to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention."

I claim:

1. A receiver for modulated bandspread carrier signals comprising, in combination:
   an antenna for intercepting a plurality of signals;
   a radio frequency section in communication with said antenna for selecting a received signal from said plurality of signals;
   an intermediate frequency section in electrical communication with the radio frequency section for converting said received signal to an intermediate frequency signal;
   a digitizing means connected to said intermediate frequency section for digitizing said intermediate frequency signal and for providing a digitized signal having a first value when said digitized signal exceeds a threshold value and having a second value when said digitized signal is less than said threshold value;

a first multiplication means connected to the digitizing means for modulating said digitized signal with a pseudo-random code stored in memory of said receiver;

a sampling means connected to said first multiplication means for sampling a modulated carrier signal at the output of said first multiplication means;

a counter means receiving a sampling signal from said sampling means for providing a counter output signal increasing in a linear manner when said carrier signal is not present and for providing a counter output signal varying in a non-linear manner when said carrier signal is present;

a pair of multiplier circuits each receiving said counter output signal, a first of said multiplier circuits receiving a first clock signal from a first clock pulse generator and a second of said multiplier circuits receiving a second clock signal from said first clock pulse generator, said first clock signal being shifted in phase from said second clock signal by a phase-shifter means, said multiplier circuits providing I and Q components of said counter output signal;

a pair of summing circuits receiving said I and Q components respectively for providing a first sum of I components and a second sum of Q components, said first sum being $I = -Z(0) + 2Z(\pi) - Z(2\pi)$ and said second sum being $Q = -Z(0) + 2Z(\pi/2) - 2Z(3\pi/2) + Z(2\pi)$ wherein said sums being whole integers, multiples and fractions of said I and Q components, with the addends being the respective counts at the parenthetic instances where $2\pi$ is the period of said intermediate frequency signal digitized and the temporal sequence of the first and second sums being said I and Q components, said I and Q components being fed back to said modulating means and said multiplier circuits.

2. The receiver of claim 1 wherein said intermediate signal has a frequency of 5 kilohertz.

3. The receiver of claim 1 wherein said modulated carrier signal is sampled at twice the frequency at which said pseudo-random code is read out of said storage memory.

4. The receiver of claim 1 further comprising a phase-shifter means connected to said first clock pulse generator for providing said offset between said first clock signal and said second clock signal, said offset being a quarter period of said intermediate frequency signal.

5. The receiver of claim 1 wherein said digitized signal includes the values of "0" and "1".

6. The receiver of claim 1 wherein said digitized signal includes the values of "+1" and "−1".

7. The receiver of claim 1 wherein said counter means is periodically reset.

8. The receiver of claim 1 wherein said sampling means comprises a J-K flip-flop circuit.

9. The receiver of claim 1 wherein said elements of the receiver form a Costas loop.

10. The receiver of claim 1 wherein said elements of the receiver form an early/late control loop.

11. The receiver of claim 1 wherein said first multiplication means comprises an exclusive -OR gate.

12. A method for receiving modulated bandspread carrier signals, said method comprising the steps of;

intercepting a plurality of signals;

selecting a received signal from said plurality of signals;

converting said received signal to an intermediate frequency signal;

digitizing said intermediate frequency signal and providing a digitized signal having a first value when said digitized signal exceeds a threshold value and having a second value when said digitized signal is less than said threshold value;

modulating said digitized signal with a pseudo-random code for providing a modulated carrier signal;

sampling said modulated carrier signal for providing a sampling signal;

providing a counter output signal from said sampling signal, said counter output signal increasing in a linear manner when said carrier signal is not present and for providing a counter output signal varying in a non-linear manner when said carrier signal is present;

receiving said counter output signal for multiplication by a first clock signal and a second clock signal, said first clock signal being shifted in phase from said second clock signal by a half period of said intermediate frequency signal, said multiplication providing I and Q components of said counter output signal; and receiving said I and Q components for providing a first sum of I components and a second sum of Q components, said first sum being $I = -Z(0) + 2Z(\pi) - Z(2\pi)$ and said second sum being $Q = -Z(0) + 2Z(\pi/2) - 2Z(3\pi/2) + Z(2\pi)$ wherein said sums being whole integers, multiples and fractions of said I and Q components, with the addends being the respective counts at the parenthetic instances where $2\pi$ is the period of said intermediate frequency signal digitized and the temporal sequence of the first and second sums being said I and Q components.

13. The method of claim 12 wherein said intermediate signal has a frequency of 5 kilohertz.

14. The method of claim 12 wherein said modulated carrier signal is sampled at twice the frequency at which said pseudo-random code is read.

15. The method of claim 12 wherein said digitized signal includes the values of "+1" and "−1".

16. The method of claim 12 wherein said digitized signal includes the values of "0" and "1".

* * * * *